Nov. 3, 1936.  O. RODER ET AL  2,059,750
PROCESS FOR THE PRODUCTION OF LITHIUM SALTS AND METALLIC LITHIUM
Filed Sept. 10, 1932
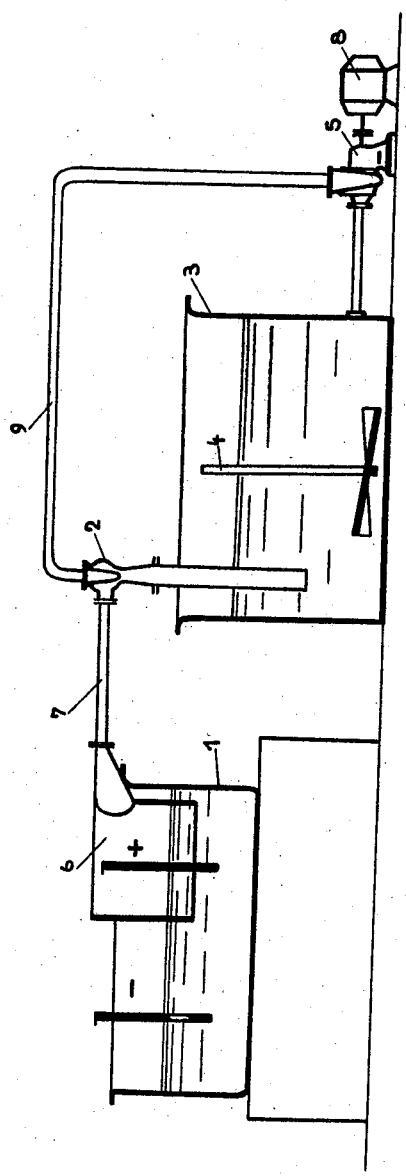

UNITED STATES PATENT OFFICE 2,059,750

PROCESS FOR THE PRODUCTION OF LITHIUM SALTS AND METALLIC LITHIUM

Oskar Roder, Langelsheim, and Hans Siegens, Goslar, Germany, assignors to American Lurgi Corporation, New York, N. Y., a corporation of New York Application September 10, 1932, Serial No. 632,626
In Germany September 15, 1931

9 Claims. (Cl. 204—19)

This invention relates to a process for the production of lithium salts and metallic lithium from material containing lithium and especially minerals containing same.

According to the hitherto known processes, lithium salts have been obtained from lithium minerals by decomposing the latter by heating them with acids, preferably sulphuric acid, or with salts, preferably acid or neutral sulphates, and lixiviating the resulting product with water. In this manner a lithium salt solution is obtained which apart from containing other alkali metals is more or less highly contaminated with heavy metals, especially in the acid processes. After a usually very cumbersome purification of the liquor obtained, which is attended by relatively large losses of lithium, the lithium is finally precipitated as fluoride, carbonate or phosphate. For the further recovery of metallic lithium, these salts are converted into the chloride which is subjected to fusion electrolysis. The hereinbefore described processes are usually very expensive in consequence of the cumbersome and costly plant and the high consumption of energy.

According to the present invention, the recovery of the lithium content of substances which do not contain lithium in a water-soluble form is effected in a surprisingly simple manner by treating said substances with chlorine or another halogen, for example, by suspending the material, for example a lithium mineral, in water or in an aqueous solution, preferably in a finely divided form, and subjecting same to the action of chlorine or another halogen. When employing gaseous chlorine the same can be allowed to act on the aqueous suspension in the most diverse ways, for example, by introducing the chlorine gas preferably in a finely divided form, into the liquid, by employing irrigating towers or the like. In this manner the lithium is obtained in the form of a solution of its chloride which is of particular advantage inasmuch as the anhydrous salt obtainable by a simple evaporation can be used directly for the electrolytic production of metallic lithium.

The process of the present invention has proved particularly suitable for the decomposition of ferruginous lithium phosphates such as for example, triphylin ($FeLiPO_4$) it having been ascertained that the iron present assists the favourable course of the decomposition process. If for example, an aqueous suspension of such a mineral preferably in a finely divided state be treated with chlorine gas or another halogen, the iron present in a divalent form is oxidized to ferric phosphate, whereas the lithium dissolves as chloride.

The solution thus obtained is so pure, particularly in the case of treatment of triphylin, that it can be concentrated by evaporation without any special purification treatment, for example after merely filtering it from undissolved residues, the chloride thus obtained being adapted to be employed after dehydration for the recovery of metallic lithium by fusion electrolysis.

The chlorine produced during the course of the electrolysis can be employed for attacking a fresh quantity of mineral and this can be carried out in a particularly advantageous manner for example by taking off the chlorine from the electrolytic cells by means of a water jet blower and employing the chlorinated water thus obtained for the decomposition. The aqueous suspension of the finely divided mineral can also be employed directly for the operation of the water jet blower.

In order more clearly to understand the nature of the invention reference is made to the occompanying drawing, which illustrates diagrammatically and by way of example a particularly suitable form of plant for carrying out this embodiment of the invention.

This plant consists of an electrolytic cell 1 containing molten lithium chloride and which contains electrodes designated by positive and negative signs, a hood 6, enveloping the anode from which the chlorine evolved from the anode can be sucked off through the pipe 7 by means of the water jet blower 2. This water jet blower is operated by means of a suspension of finely divided mineral containing lithium, such as triphylin, which is contained in a vessel 3 provided with stirring apparatus 4, and which is fed by pump 5 driven by motor 8 through the pipe 9 in a cycle.

The said suspension is circulated through the water jet blower until the mineral contained therein has been decomposed to the desired extent, whereupon a second plant can be connected up likewise consisting of a vessel provided with stirring apparatus, a water jet blower and pump which is charged with a fresh suspension of mineral.

Any chlorine lacking may, in order to supplement losses of chlorine at the anode or in the circulatory plant, also be led from any other source to any desired point in the plant in this embodiment of the process.

The hereinbefore described treatment of the material containing lithium may also be carried out at elevated temperature and also under increased pressure, for example at a temperature lying above the boiling point of the water employed or of the aqueous solution and under correspondingly increased pressure.

Moreover the hereinbefore described process is not limited to the action of halogen in an aqueous medium. Thus for example, gaseous chlorine may also be caused to act upon the material containing lithium directly or in suspension in a non-aqueous fluid medium.

Example 200 kgs. of triphylin containing:

| | Percent |
|---|---|
| Li | 2.85 |
| $P_2O_5$ | 41.9 |
| FeO | 34.75 |
| MnO | 10.2 |
| $Al_2O_3$ | 1.2 |
| MgO | 0.9 |
| $SiO_2$ | 3.3 | are ground to such a degree of fineness that they will pass through a sieve containing 4,900 to 10,000 meshes per square cm. The fine greyish-green powder is stirred up to a suspension with 600 litres of water in a vessel provided with efficient stirring apparatus. Chlorine is then slowly passed into the suspension thus obtained with the aid of a device for effecting good distribution of the gas. During this operation the strength of the current is adjusted so that the bubbles ascending in the liquid are absorbed before they reach the surface of said liquid. As the reaction progresses the suspension assumes a yellow colouration and becomes red-brown on completion of the process. The suspension is filtered and the residue is subsequently well washed with water, whereupon about 600 litres of filtrate are obtained containing 8.04 grammes of lithium, 26 grammes of chlorine and 0.4 grammes of $PO_4$ per litre together with traces of iron and manganese. The iron and manganese are precipitated in known manner and the solution thus purified is evaporated to dryness. By fusing this latter residue 30 kgs. of anhydrous lithium chloride are finally obtained, corresponding to a yield of lithium of 84.6% of the lithium content of the triphylin.

We claim:—

1. A process for recovering the lithium content of a ferruginous substance containing lithium phosphate which comprises treating the substance with a free elementary halogen in an aqueous medium.

2. A process for recovering the lithium content of a ferruginous lithium phosphate mineral substance which comprises treating the substance with a free elementary halogen in an aqueous medium.

3. A process for recovering the lithium content of a ferruginous water-insoluble lithium phosphate which comprises dissolving the lithium as a lithium halide by treating the substance in finely divided condition with a free elementary halogen in an aqueous medium.

4. A process for recovering the lithium content of triphylin which comprises treating the triphylin with a free elementary halogen in an aqueous medium.

5. A process for recovering the lithium content of a ferruginous substance containing water-insoluble lithium phosphate which comprises dissolving the lithium as lithium chloride by treating the substance in finely divided condition with free elementary chlorine in an aqueous medium.

6. A process for recovering the lithium content of a ferruginous substance containing water-insoluble lithium phosphate which comprises dissolving the lithium as lithium chloride by treating the substance with free elementary chlorine in an aqueous medium, electrolytically decomposing the lithium chloride in molten condition into lithium and chlorine and treating fresh lithium-containing material with the chlorine.

7. A process for recovering the lithium content of a water-insoluble ferruginous lithium phosphate which comprises dissolving the lithium as lithium chloride by treating the substance in finely divided condition with free elementary chlorine in an aqueous medium, electrolytically decomposing the lithium chloride in molten condition into lithium and chlorine, drawing off the chlorine evolved in the electrolytic decomposition by means of a water-jet pump and treating fresh lithium-containing material with the chlorine water from the pump.

8. A process for recovering the lithium content of a water-insoluble ferruginous lithium phosphate which comprises dissolving the lithium as lithium chloride by treating the substance in finely divided condition with free elementary chlorine in an aqueous medium, converting the lithium chloride solution into anhydrous lithium chloride, electrolytically decomposing the lithium chloride in molten condition into lithium and chlorine, drawing off the chlorine evolved in the electrolytic decomposition by means of a water-jet pump, feeding the water-jet pump with an aqueous suspension of the lithium containing substance, dehydrating the lithium chloride in the resulting liquor and replacing with it material consumed in the electrolytic decomposition.

9. A process for recovering the lithium content of triphylin which comprises dissolving the lithium as lithium chloride by treating the triphylin in finely divided condition with free elementary chlorine in an aqueous medium, converting the lithium chloride solution into anhydrous lithium chloride, electrolytically decomposing the lithium chloride in molten condition into lithium and chlorine, drawing off the chlorine evolved in the electrolytic decomposition by means of a water-jet pump, feeding the water-jet pump with an aqueous suspension of the triphylin, dehydrating the lithium chloride in the resulting liquor and replacing with it material consumed in the electrolytic decomposition.

OSKAR RODER.
HANS SIEGENS.